United States Patent [19]

Cary

[11] 4,300,918
[45] Nov. 17, 1981

[54] METHOD FOR REMOVING MOISTURE PARTICLES

[75] Inventor: Boyd Cary, Fairfax, Va.

[73] Assignee: Parmatic Filter Corporation, Livingston, N.J.

[21] Appl. No.: 128,930

[22] Filed: Mar. 10, 1980

Related U.S. Application Data

[63] Continuation-in-part of Ser. No. 903,560, May 8, 1978, abandoned.

[51] Int. Cl.³ .................. B01D 50/00; B01D 39/12
[52] U.S. Cl. .................................... 55/1; 55/97; 55/337; 55/486; 55/525; 55/DIG. 43
[58] Field of Search ............... 55/315, 320, 328, 329, 55/333, 440, 486, 489, 525, 526, 1, 97, 337, DIG. 25, DIG. 43; 210/493, 499, 500

[56] References Cited

U.S. PATENT DOCUMENTS

| | | | |
|---|---|---|---|
| 1,798,492 | 3/1931 | Plourde | 55/489 |
| 2,443,238 | 6/1948 | Glanzer | 55/489 |
| 2,619,188 | 11/1952 | Haw et al. | 55/489 |
| 2,929,464 | 3/1960 | Sprouse | 55/489 |
| 3,280,542 | 10/1966 | Heijnis | 55/489 |
| 3,659,402 | 5/1972 | Alliger | 210/499 |
| 3,780,872 | 12/1973 | Pall | 55/525 |
| 3,802,158 | 4/1974 | Ohle | 55/320 |
| 4,086,070 | 4/1978 | Argo et al. | 55/486 |
| 4,144,040 | 3/1979 | Claes | 55/97 |
| 4,158,449 | 6/1979 | Sun et al. | 55/337 |

FOREIGN PATENT DOCUMENTS

| | | | |
|---|---|---|---|
| 84257 | 8/1952 | Denmark | 55/97 |
| 172243 | 8/1960 | Sweden | 55/97 |
| 555043 | 7/1943 | United Kingdom | 55/525 |
| 830188 | 3/1962 | United Kingdom | 55/97 |
| 1370919 | 10/1974 | United Kingdom . | |

*Primary Examiner*—David L. Lacey
*Attorney, Agent, or Firm*—Lerner, David, Littenberg & Samuel

[57] ABSTRACT

An improved method for removing particles entrained in air, particularly moisture particles which may contain salt or other contaminating matter. The improved method is particularly useful in connection with marine applications for removing moisture particles from air being introduced to a gas turbine on a marine vehicle. The improved method includes the steps of passing the air at a velocity greater than 20 ft. per second through an inertia separating device for inertially removing at least a portion of the larger sized particles in the air to provide partially processed air, and then passing the partially processed air at a velocity which is greater than a predetermined velocity through an impact filtering pad for removing particles entrained in partially processed air. The impact filtering pad comprises at least one layer of a plurality of fibers, each of the fibers having a diameter greater than 0.001 inches and less than 0.006 inches, and the ratio of total surface area of the fibers in the pad to the volume of the pad being greater than 45 ft.$^{-1}$ and less than 1400 ft.$^{-1}$. The predetermined velocity at or above which the partially processed air is passed through the impact filtering pad is greater than 20 ft. per second and is chosen according to the diameter of the fibers in the pad so that there is no coalescense of moisture particles captured by the pad.

7 Claims, 5 Drawing Figures

U.S. Patent  Nov. 17, 1981  Sheet 1 of 2  4,300,918
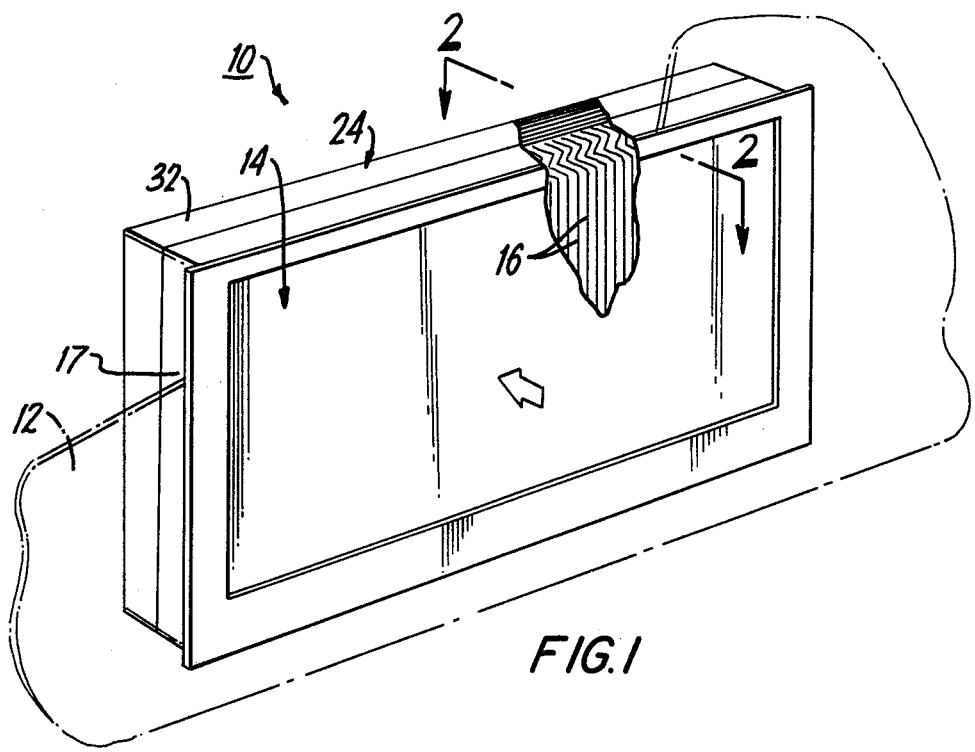
FIG. 1
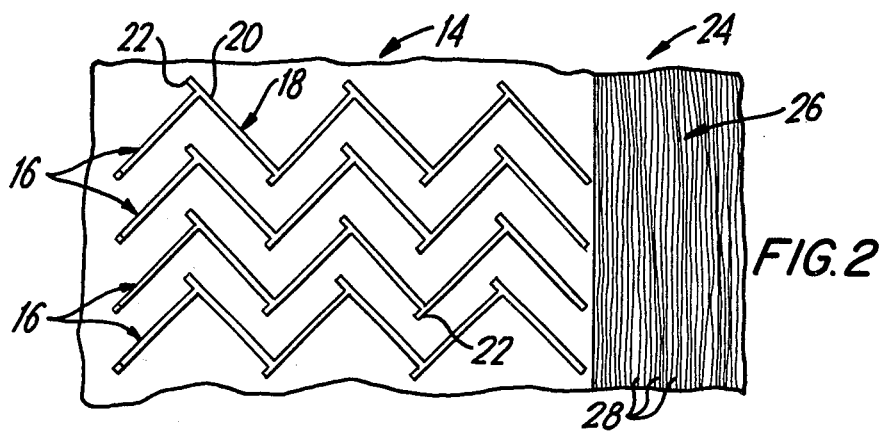
FIG. 2
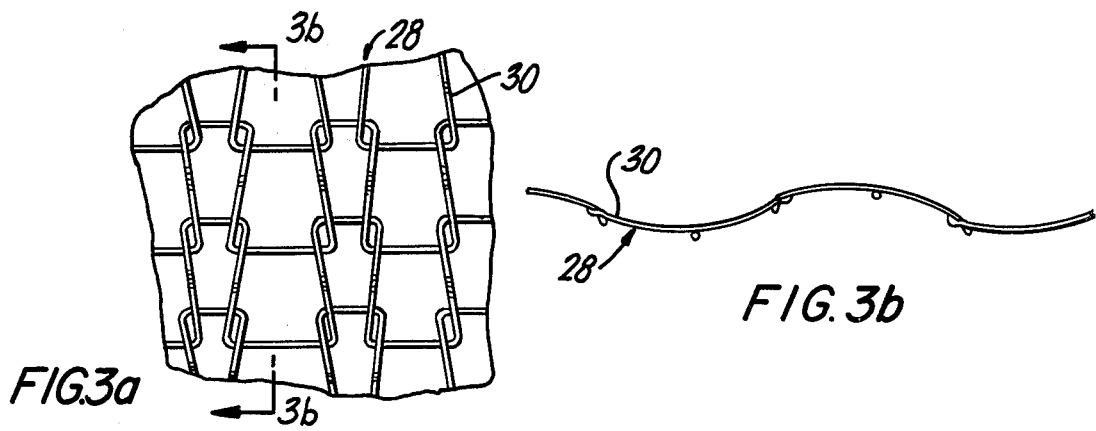
FIG. 3a
FIG. 3b

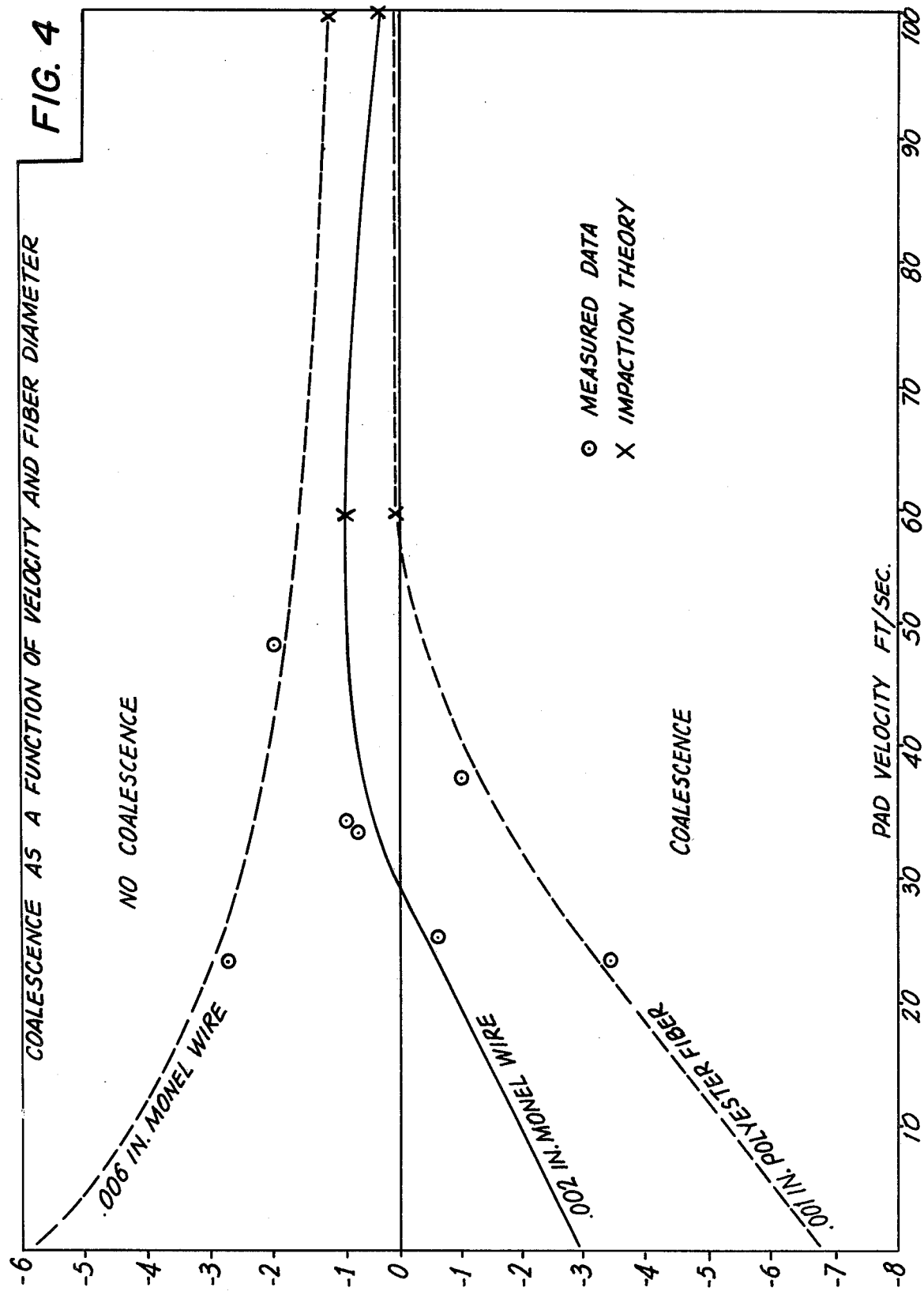

METHOD FOR REMOVING MOISTURE PARTICLES

BACKGROUND OF THE INVENTION

This is a continuation-in-part of U.S. Pat. application No. 903,560, filed May 8, 1978, now abandoned.

The present invention relates to separating devices and methods, and more particularly to separating devices and methods for gas turbines in environments having moisture particles in the air such as gas turbines for marine applications. For example, the method of the present invention is particularly useful for removing moisture particles entrained in air entering the air intake of a gas turbine for ships.

Moisture separators are provided for gas turbines for marine applications as the moisture particles in the air generally contain salt which, if it should be introduced into the turbine, would deleteriously affect the component parts of the turbine, as for example, by chemical corrosion. Further, the dry particles entrained in the air, for example sand and/or salt crystals, can cause "pitting" of the turbine components if they are not removed. However, by far the greatest concern is the moisture particles containing salt.

One early prior art device for removing moisture and other particles from the air introduced into the turbine comprised a single stage wire mesh pad placed in the air intake duct. The mesh pad was generally comprised of a plurality of layers forming an approximately two inch thick pad with each of the layers in turn comprised of a plurality of 0.006 inch diameter wires knitted into a grid or screen having approximately five to six stitches per inch, i.e., there were approximately five wires per inch of length stiched or joined together. The moisture particles were removed as a result of the particles impacting against and being captured by the wires of the pad as the air passed through the device. However, such a wire mesh pad did not adequately and efficiently remove all sized moisture particles entrained in the air and thus, was not acceptable.

Another prior art device for removing moisture particles which was found to be more accceptable, comprised a three stage separator in which the first and third stages were inertia separating vanes and the second stage was a coalescer. The first and third stage vanes had generally similar performance characteristics, one of which was that they exhibited very poor efficiency in removing smaller sized droplets, namely, eight microns and below. The reason for this is simply that inertia separating devices work on the principle that as the air flow turns to bypass the vanes or other impacting medium the moisture particles, being of larger size and more mass, cannot make the turns and instead impinge or impact upon the impacting medium, thereby being removed from the air stream. However, these conventional inertia vanes do not prove efficient to remove lower size droplet particles since such particles, being of lighter mass, can make the turns to avoid impacting on the vanes. As a consequence, the prior art employed a second stage filter comprised generally of a plurality of polyester fibers of 0.001 inch diameter or smaller. The duty of the second stage was to capture the fine droplets by inertial impaction that had passed through the first stage. Owing to their smaller diameter, the capture efficiency of the fibers was high so that some of the fibers would tend to collect several droplets which then coalesced or grouped together until a droplet was formed which was large enough to be re-entrained by the aerodynamic drag forces of the air passing therethrough. These re-entrained droplets were then captured by the third stage inertial device (either vanes or cyclones).

However, the addition of the third stage added greatly to the overall size and weight of the moisture separator, which already was quite large in order to achieve the high mass flow rates needed by the gas turbines for ships (on the order of 2000 cubic feet per second). Further still, the use of a polyester fiber pad having a plurality of closely spaced and dense fibers, each of a small diameter (on the order of 0.001 of an inch or smaller), tended to increase the flow resistance, and thus the pressure drop across the separator, for a given velocity of air flow. Thus, to achieve the desired flow rate, the size of the polyester pad and thus the size of the air duct in which the moisture separator was supported also had to be increased, thereby further adding to the weight, bulkiness, cost, etc. of the separating device.

It should be noted in this connection that various types of other filtering or separating arrangements and, in particular filtering pad arrangements, not specifically directed for use in marine applications are known in the prior art. For example, in U.S. Pat. No. 4,086,070 to Argo et al, there is disclosed a fiber bed separator and method for separation of aerosols from gases without re-entrainment. In the improved fiber bed separator of Argo et al., there is provided a pair of fiber beds each comprised of a plurality of fiber elements or wires. In this reference, the distinction is made between the amount of water which is held by the bed after draining by gravity and that held against the drag of flowing gas or air therethrough. More particularly, the fiber diameter and bed voidage for the first or front bed in Argo et al. is selected such that at the design bed velocity and aerosol loading, the first bed will not be flooded and the residual saturation thereof against gas drag on the liquid collected will be less than the residual saturation of the bed against gravity drainage of the liquid. In other words, the front or first bed of fibers in Argo et al. is such that the collected liquid in the bed that does not drain by gravity will be blown through to the second fiber bed. In the second fiber bed on the other hand, the fiber diameter and bed voidage are chosen so that the residual saturation thereof against gas drag will be greater than the residual saturation of the bed against gravity drainage so that the liquid collected by the second bed will drain off by gravity as opposed to being re-entrained.

Thus, in accordance with the Argo et al teaching, a more dense fiber pad is used as a first stage in a filtering device in which the residual saturation against gravity drainage is greater than the residual saturation against gas phase drag so that liquid which does not drain from the first stage will be blown through to a second pad where the residual saturation against gas phase drag is greater than the residual saturation against gravity drainage so that liquid will drain off rather than be re-entrained in the air. Accordingly, the Argo et al solution to the problem of re-entrainment experienced in the prior art is to provide a second pad having specific characteristics chosen so that the pad has a greater tendency to drain captured or collected liquid by means of gravity than to permit re-entrained.

However, upon a detailed examination of the Argo et al system, it is seen that the flow velocities through the fiber pads with which the Argo et al arrangement is concerned are relatively low in comparison to the flow velocities through filtering arrangement used in connection with marine applications; i.e., the Argo et al arrangement is specifically designed to be utilized in connection with flow velocities which are generally less than 10 feet per second, whereas in marine applications flow velocities of greater than 20 feet per second are experienced. Furthermore, it is to be noted that from an examination of the Argo et al. reference, in particular FIGS. 1 and 7, Argo et al. suggests that the residual saturation of the second fiber bed against gas phase drag in virtually all instances decreases as the velocity through the bed increases, and that the upper limit of velocity through the bed is usually set by re-entrainment problems. This may be due to the fact that the Argo et al reference teaches that the particles captured by the fiber beds coalesce and drain by gravity.

In this regard, it is to be noted that re-entrainment of any collected or coalesced liquid droplets would require an additional device downstream of the filter pad for the purpose of recapturing the re-entrained particles in order to prevent the introduction of such moisture particles which are re-entrained to the turbine.

Another type of arrangement of the prior art, again not specifically directed for use as a moisture separator in marine applications, is disclosed in U.S. Pat. No. 4,158,449 to Sun et al. This patent discloses an inlet air cleaner assembly for turbine engines which are mainly used in connection with agricultural aircraft for the application of chemicals over large and not readily accessible land area. In the arrangement of this reference, there is provided a first stage vortex air cleaner and a second stage mist eliminator assembly. The first stage vortex air cleaner operates generally on the principles of inertia separating devices for removing heavier and larger sized contaminants particles in the air to provide partially processed air. The second stage of the filtering arrangement comprises a plurality of superimposed knitted wire mesh sheets which define passages therethrough for removing light-weight or well dispersed solid contaminate particles and liquid droplets. The wire mesh sheets are comprised of a plurality of monofiliments which may have a diameter ranging from 0.0005 inches to 0.035 inches and which are compressed substantially throughout the surface area. The monofiliments preferably are coated with oil or another nonvolatile liquid so that liquid which is removed by impingement on the oil coated wires of the mesh will tend to flow by gravity downwardly and collect in the bottom of the mist eliminator stage for subsequent removal.

Thus, it is apparent that even in this reference which is not mainly concerned or directed to a separator assembly for marine applications, there is the suggestion that liquid which is removed by the mist eliminator assembly coalesces and drains by gravity to a lower portion of the assembly. As such the use of this reference in a marine application where moisture particles are to be removed, would suggest that a further separating device is required downstream thereof for capturing any coalesced particles which become re-entrained. That is, because of the suggestion of coalescence occuring, it would be expected, especially at the particularly high flow velocities with which separating devices for marine applications are concerned that there is the possibility of the coalesced particles becoming re-entrained in the air stream. Thus, it would be expected that such re-entrainment of coalesced particles would create a problem, such as experienced in connection with some of the other prior art arrangements discussed hereinabove, if the Sun et al. arrangement were used, and thus necessitate the use of additional separator devices or means downstream of the filtering pad. In this regard, as noted above, coalescense would create a problem of re-entrainment at the relatively high flow velocities such as experienced in connection with marine applications since the aerodynamic drag forces produced thereby have a greater tendency to cause reentrainment of the enlarged coalesced droplets.

SUMMARY OF THE INVENTION

These and other disadvantages of the prior art are overcome with the improved method of the present invention for removing particles, and in particular moisture particles, entrained in air passing therethrough. In the improved method of the present invention, air such as to be introduced to a gas turbine on a ship, is passed at a velocity greater than 20 feet per second through an inertia separator means for inertially removing at least a portion of the larger sized particles from the air to provide partially processed air. The velocity of the air flow through the inertia separator means being greater than 20 feet per second is chosen as it is above this velocity that inertia separating devices are most effective for removing particulate matter entrained in the air. The partially processed air is then passed at a velocity greater than a predetermined velocity to an impact filtering pad for removing particles entrained in the partially processed air. The impact filtering pad comprises at least one layer of a plurality of fibers, each of the fibers having a diameter greater than 0.001 inches and less than 0.006 inches, and the pad having a ratio of the total surface area of the fibers in the pad to the volume of the pad which is greater than 45 ft.$^{-1}$ and less than 1400 ft.$^{-1}$. The predetermined velocity above which the partially processed air is passed through the impact filtering pad is greater than 20 feet per second, and is chosen according to the diameter of the fibers comprising the pad so that there is no coalescence of moisture particles captured by the pad. Accordingly, since coalescence of captured liquid droplets does not occur, a third stage of filtering means downstream of the impact filtering pad is not necessary; rather, the fibers of the impact filtering pad serve to capture and retain the particles impacted thereon.

Accordingly, in accordance with this method, improved separation is achieved with a minimum number of components, and in particular with a two stage separator device, thereby reducing the weight, bulkiness, cost, size, etc. of the separating means utilized.

These and other advantages of the present invention will be apparent from the following detailed description in which reference is made to the enclosed drawings which illustrate a preferred embodiment of the present invention.

BRIEF DESCRIPTION OF THE DRAWINGS

FIG. 1 is a perspective view, partially broken away, of a separator device employed in accordance with the present invention as a moisture separator for the air intake to a gas turbine on a ship.

FIG. 2 is a partial sectional view of the moisture separator illustrated in FIG. 1, taken along lines 2—2 of FIG. 1.

FIG. 3a is a plan view of a portion of one layer of the impact filtering pad of the present invention.

FIG. 3b is a side view taken along lines 3b—3b of FIG. 3a.

FIG. 4 is a graphic representation illustrating the coalescense of moisture particles for the impact filtering pad as a function of velocity through the pad and the fiber diameter of fibers comprising the pad.

DETAILED DESCRIPTION OF THE PREFERRED EMBODIMENT

Turning now to the drawings in which like reference characters represent like elements, there is shown in FIG. 1 a moisture separating device 10 in accordance with the present invention in which the moisture separator 10 is placed in the air intake duct 12 of a gas turbine (not shown). As the separating device 10 in accordance with the present invention is particularly useful for removing moisture particles entrained in the air in which the moisture particles contain salt, the present invention is particularly useful for use with gas turbines on ships or other amphibious vehicles. It should also be understood that the separating device of the present invention is also useful in removing dry particles entrained in the air, such as for example, sand, salt crystals, etc. which also have a tendency to damage turbine components. However, as the separating device is primarily intended to remove moisture particles entrained in air, the present invention will be described with reference to such application.

It should be noted here that it is not the moisture per se which is undesirable but rather contaminate particles such as salt and the like which are dissolved in or carried by the moisture particles which are undesirable. However, as can be appreciated, the elimination of the moisture particles from the air will also serve to eliminate these undesirable contaminated particles.

In gas turbines for marine applications, the air ducts are placed high up in the ship or the vehicle so that as little moisture as possible might be entrained in the air being introduced into the gas turbine, and in such instance, the moisture separators would be mounted at the entrance of the air duct. The required air flow to be introduced to the turbine is on the order of magnitude of 2000 cubic feet per second and greater. The mass flow rate in turn is dependent upon the cross-sectional area of a duct through which the air is introduced and the velocity of the flow therethrough. For example, if the flow velocity through the duct can be increased, the cross-sectional area of the duct (and thus the size of the duct) can be reduced substantially. On the other hand, the pressure drop across the moisture separator placed in the duct must be maintained at an acceptable level. As the pressure drop across the moisture separator is dependent on both the flow resistance presented by the moisture separator and also the velocity of the flow therethrough, the pressure drop thus serves as a limit on the increase in flow velocity which can be obtained to satisfy the requirements for a given mass flow rate. Therefore, as it is desirable to decrease the size of the air duct (to save on costs, weight, etc.), it is desirable to design the moisture separator so as to have as low a flow resistance as possible. At the same time, the reduction in flow resistance presented by the moisture separator must not be such as to impair the efficiency to remove the moisture particles from the air passing through the separator.

With these principles in mind, the moisture separator in accordance with the present invention will now be discussed. As shown in FIG. 1, the moisture separator 10 comprises a two stage separating device. The first stage 14 of the separating device 10 comprises a conventional inertia device through which the air flow to be introduced to the turbine first passes. This inertia device, in the preferred embodiment, comprises, as is convnetional, a plurality of chevron or V-shaped vanes 16 vertically oriented and closely spaced to one another. However, it should, of course, be understood that other types of inertia devices could be used, as for example, cyclone separators. The plurality of vanes 16 are supported in a support frame 17 which holds the upper and lower ends of the vanes 16 in fixed position. Further, a drain for moisture removed from the air is generally provided in the bottom of the first stage 14, although it has not been shown.

As best seen in FIG. 2, the vanes 16 of the first stage inertial device 14 each have three peaked sections 18. The peaked sections 18 of adjacent vanes 16 thus define a tortuous path for the air flowing therethrough. In other words, as the air flows through the vanes 16, it must turn or bend several times to follow the path between the peaked sections 18 of adjacent vanes 16. As the entrained particles, such as for example, moisture particles containing salt, sand or other particular matter, are generally of a larger mass than the air particles, the entrained particles are thrown outwardly during the turns against the surfaces of the vanes 16 due to the centrifical force exerted thereon. That is, the lighter air particles are capable of making the turns through the series of peaked sections 18, whereas the heavier mass particles are not, thereby resulting in the larger particles impacting on the surface of the vanes 16. Each of the peaks 20 of the vanes 16 include stops 22 for preventing the impacted particles from sliding along the surface of the vanes 16 and becoming reentrained by virtue of the aerodynamic drag force exerted by the air flow.

As can be appreciated, the heavier the particles entrained in the air, the more likely such particles will impact on the vanes 16 and thus be removed from the air flow. On the other hand, lighter particles may have a tendency to successfully follow the flow path and remain entrained in the air. For example, inertia separator devices such as the stage 14 have been found to be efficient in removing moisture particles of a size over 8 microns (25.4 microns approximately equals 0.001 inches) in the range of the high flow velocities with which moisture separators for gas turbines are concerned, i.e., greater than 20 feet per second. However, the plurality of vanes 16 have not exhibited a high efficiency for removing moisture particles in the lower size droplet range, namely 8 microns and below. Thus, it is necessary to utilize further stages or devices for removing such lower sized particles.

After being partially processed by the first stage 14 of the moisture separator 10, the air is introduced through the second stage 24 which serves to further process the air to remove particles still entrained therein. As best seen in FIG. 2, 3a and 3b, the second stage of the separating device comprises an impact separating pad 26 comprised of at least one layer 28 of a plurality of fibers 30. In the embodiment shown in FIGS. 2, 3a and 3b, the pad 26 is actually comprised of a plurality of layers 28 of knitted wettable fibers 30. The layers 28 of pad 26 are supported in a frame 32 which is affixed to the downstream side of the first stage 14.

In the preferred embodiment, the fibers 30 forming the layers 28 of the pad 26 are comprised of monel wire. Monel is an alloy containing primarily nickel and copper, and other elements, and has been found to be extremely useful in marine type application since it is especially resistant to corrosion by salt entrained in the moisture of sea water.

As best seen in FIG. 3a which is a plan view of a portion of one layer of the pad 26, the wire fibers 30 have been knitted together to form a mesh or grid having the wires 30 joined or tied together. Preferably, the diameter of the fibers or wires 30 is on the order of 0.002 inches, but the diameter can range between 0.001 inches to 0.006 inches. With 0.002 inch diameter wire, it has been found with conventional knitting apparatus that there are approximately 10 to 12 stitches or joints per inch of mesh. That is, in a one inch length of the wire mesh 28, there are approximately 10 to 12 wires 30.

Also in the preferred embodiment, during the knitting operation, the wires 30 are crimped or bent slightly so that each of the layers 28 does not lie completely flat. This is shown in FIG. 3b. Thus, when the layers 28 are combined to form the pad 26, the layers 28 will not lie flat against one another but instead will provide a cushioning or "lofty" medium. In the preferred embodiment, the crimp is sufficient to allow no more than 20 or 24 layers per inch of depth of the pad 26. In this regard, it is to be noted that without the crimping of the wires 30, it has been found that there would be approximately 70 to 75 layers 28 of wires 30 per inch of pad depth. The reason that crimping of the wires 30 is desirable is that for a given number of layers 28, the resistance to flow (which is proportional to the pressure drop across the pad) will be lower if the distance between adjacent layers 28 is increased.

It should be noted that wire fibers 30 have been found to be preferable to form the layers 28 since the wires 30 will retain the crimp which is provided during the knitting or stitching operation to form the layers 28. Further, wires 30 provide a wettable surface which is most useful in capturing the particles of moisture which impact on the wires 30 as the air flows thereacross.

The mechanism by which the wire fiber pad 26 serves to remove particles from the air is inertial impaction. As the air "weaves" its way through the thickness of pad 26, the particles entrained in the air (for example particles of moisture containing salt, particles of sand, etc.) are not able to avoid the wires 30 and thus impact on the wires 30. With moisture particles, the surface tension or adhesion between the metallic wires 30 and the moisture particles which impact thereon is great and thus, the moisture particles are captured and removed from the stream of air. This would also be true with respect to other types of particulate matter entrained in the air, such as for example, salt crystals (produced when water of sea water evaporates) or sand, but it is to be noted that the adhesion or surface tension between such particles and the surface of the wires 30 is much less than with moisture particles. However, this is acceptable since the greatest concern is the sea water containing salt.

It should be noted that the smaller the size of the fibers 30, the more efficient the fibers 30 are in capturing fine moisture particles entrained in the air. That is, small diameter fibers have a relatively high capture efficiency by impaction. However, with too small of a fiber size, the chances are significantly increased that several droplets of moisture will be captured by the same fiber. When this occurs, the small droplets tend to coalesce together to form large droplets, such as for example, over 8 microns in size. Since the aerodynamic drag force will be greater on these coalesced droplets, there is a good chance that they will re-entrained in the air.

This is the reason why, with prior art separating devices which used a fiberous pad having fiber diameters of 0.001 inch or smaller, it was necessary to provide a third stage for capturing the large coalesced droplets. While it has been found that the degree of coalescence of smaller size particles, say in the range of 2 to 4 microns growing to 10 microns in size and above, is not great (on the order of 3 to 5%), it is significant enough that a third inertial impacting stage, such as for example, vanes or cyclones, was necessary to remove such coalesced particles from the air. However, in the present invention, this problem of coalescing is avoided by using a slightly larger size fiber 30, preferably having a diameter of 0.002 inches.

With respect to the various parameters for designing moisture separating devices for gas turbines, it is to be noted that the efficiency of a pad 26 for removing a particular size particle from the air is expressed by the well-known relationship for capture in a lattice arrangement:

$$\eta_p = 1 - e^{-0.212\eta_f \alpha t}$$

where:
$\eta_p$ is the efficiency for removing a particular size particle;
$\eta_f$ is the efficiency of a single fiber for removing such particular size particle;
$\alpha$ is the ratio of the total surface area of the fibers of the pad to the volume of the pad; and
t is the thickness of the pad.

Thus, as it is desirable to maintain the efficiency as close to one as possible, it is desirable to increase the product $\alpha t$. On the other hand, the pressure drop across the pad is related to the quantity $\alpha^2 t$. Thus, increasing $\alpha$ to too great a quantity, will cause the pressure drop across the pad to increase, which as noted above, is undesirable. On the other hand, it should be noted that the thickness of the pad 26 is one dimension which also goes into determining the volume of the pad. Thus, the effect on the pressure drop by simply increasing the pad thickness (but maintaining the number and size of the wires 30 the same) actually serves to decrease the pressure drop.

In accordance with the present invention, the values for $\alpha$ should range between 45 ft.$^{-1}$ to approximately 1400 ft.$^{-1}$. In this way, the efficiency can be maximized while at the same time the pressure drop maintained at an acceptable level. More preferably, the value for $\alpha$ should range between 75 and 200 ft.$^{-1}$. Also, it has been found desirable to maintain the thickness of the pad 26 between ½ inch and five inches, although of course, a lesser thickness, even down to a single layer 28 of wire mesh, could be utilized depending on the desired efficiency characteristics and pressure drop characteristics for a particular application. In the preferred embodiment, the thickness of the pad 26 is approximately three inches and comprises on the order of 70 layers 28 of the 0.002 inch diameter wire 30 having 10 to 12 stitches per inch. For such a pad 26, the value for $\alpha$ is approximately 84 ft.$^{-1}$. If the pad thickness is compressed to 1½ inches, the value for $\alpha$ would double to approximately 168 ft.$^{-1}$.

It is to be noted that with respect to the polyester pads utilized in the prior art, the value for $\alpha$ was on the order of 1800 ft.$^{-1}$. Accordingly, for a given thickness of pad, the pressure drop across a polyester fiber pad of the prior art is significantly higher than is across the pad 26 according to the present invention. Therefore, the velocity of the air flow through the pad 26 of the present invention can be increased over that which was possible with the polyester pad of the prior art. Thus, the size and weight of the moisture separator 10 can be substantially reduced, while at the same time maintaining an acceptable pressure drop level. Furthermore, since higher velocities for the air flow through the separator 20 can be attained with the pad 26 of the present invention, the particle separation efficiency is also increased. This is the result of the fact that droplet retention by impaction improves with an increase in velocity.

Moreover, owing to the larger diameter of the fibers over that of the polyester pad, the tendency of the drops to coalesce is eliminated. The reason for this is twofold. First, as the air velocity is increased, the ability of droplets to coalesce is impaired. Secondly, the aerodynamic drag forces at higher velocities is larger, and thus, the droplets are re-entrained in the air at lower sizes thereby preventing the growth of droplets by coalescing to larger sizes, say in the 10 to 13 micron range and above. The re-entrained droplets can then be captured by another fiber. Since the moisture droplets are not coalesced, there is no further need for a third stage inertia device in the moisture separator 10, which in the prior art was only useful for recapturing the coalesced moisture droplets. This elimination of the need for a third stage filter results in substantial savings, not only in cost, but also in the weight and size of the moisture separator 10.

An important point to note in this regard is the fact that for any given wire or fiber size in the impact filtering pad 26, there is a minimum flow velocity above which no coalescence will occur. It is this realization which makes such an impact filtering pad 26 as contemplated by the present invention particularly useful for the flow velocity ranges incurred in marine applications. That is, for wire sizes which are efficient in removing particulate matter from air, the flow velocity for marine applications can satisfactorily be chosen so that no coalescence will occur in the filtering pad 26, thus avoiding the necessity of any additional filtering means or stage downstream of the pad 26.

More particularly, FIG. 4 shows the relationship between the occurrence of coalescence and fiber diameter as a function of flow velocity through the impact filtering pad 26. The abscissa represents a measure of coalescence and the ordinate in FIG. 4 represents flow velocity. Three curves are shown in FIG. 4 for three different fiber diameters. The lowermost curve represents the relationship between coalescence and flow velocity for a filtering pad comprised of 0.001 inch diameter polyester fibers, the middle curve is for a pad comprised of 0.002 inch diameter monel wires; and the uppermost curve is for a pad comprised of 0.006 inch diameter monel wires. In this regard, these curves were generated using measured test data for lower flow velocities and impaction theory for higher flow velocities.

It is to be noted that impaction theory suggests that the capture efficiency for a given wire size increases with the square of the particle diameter. Therefore, in the absence of coalescence, the efficiency of captured droplets in the range of 10 to 13 microns would be greater than that in the 2 to 4 micron range. However, when coalescing occurs, some of the droplets in the 2 to 4 micron range are coalesced together and promoted to the 10 to 13 micron regime. This has the effect of improving the efficiency for the 2 to 4 micron droplets and lowering it for the 10 to 13 micron droplets. Therefore, the difference between the efficiencies for removing 10 to 13 micron particles and for removing 2 to 4 micron particles represents a measure of coalescence, i.e.:

$$\eta_{10\text{-}13\mu} - \eta_{2\text{-}4\mu} = \Delta\eta$$

where $\eta_{10\text{-}13\mu}$ is the efficiency for removing particles in the 10–13 micron range; $\eta_{2\text{-}4\mu}$ is the efficiency for removing particles in the 2–4 micron range; and $\Delta\eta$ is the difference in such efficiencies and represents a measure of coalescence. This difference in efficiences accordingly constitutes a measure of coalescence for the impact filtering pad. Thus, for $\Delta\eta$ greater than 0, no coalescence is occuring; however, if $\Delta\eta$ is less than 0, then coalescence does occur.

FIG. 4 illustrates the flow velocities which must be attained to eliminate coalescence with pads comprised of 0.001 and 0.002 inch diameter fibers. For the 0.001 inch fiber pad, a flow velocity of 60 feet per second is needed, whereas for the 0.002 inch wire diameter pad only a flow velocity of 30 feet per second is required to eliminate coalescence. The 0.006 inch wire diameter pad never exhibits coalescence in the 2 to 13 micron range.

Generally speaking, a flow velocity of 60 feet per second, required by the 0.001 inch fiber diameter pad to eliminate coalescence, will lead to an unacceptably high pressure drop for marine gas turbine inlet separator applications. This wire size for the impact filtering pad thus represents a lower limit on fiber diameter size for the impact filtering pad 26. On the other hand, the 0.006 inch wire diameter pad, while it never exhibits coalescence in the 2 to 13 micron range, has a poor capture efficiency for smaller droplets and a higher pressure drop. Therefore, this wire size represents an upper limit on wire or fiber diameter size for moisture separator applications. In terms of the preferred embodiment in which the impact filtering pad 26 is comprised of 0.002 inch diameter wires, this presents an optimum choice since only a flow velocity on the order to 30 feet per second is required to eliminate coalescence. Owing to this relatively small wire size, the capture efficiency for small droplets are relatively high and the pressure drop across the filtering pad is relatively low.

Thus, it will be appreciated that for a given fiber size there is a minimum flow velocity above which no coalescence will occur. This realization is most important since the absence of coalescence allows the elimination of a third or additional stage downstream of the impact filtering pad 26. Further, it is the absence of this realization by any of the prior art which negates any suggestion in such prior art to use an impact filtering pad in accordance with the principles of the present invention in combination with an inertia separating device 14 for a moisture separator 10 for a gas turbine. In this regard, once the particular wire size is chosen so as to be in the desired range for providing a highly efficient pad for removing particles of all sizes, the size or cross sectional area of the pad 26 need only be chosen so as to provide a flow velocity above the predetermined limit for that particular chosen size of fibers so that no coalescence will occur, taking into considersation of course the mass flow velocity which is required for turbine operation.

In this regard, as has been noted hereinabove, the wire size for such an acceptable efficiency for particles of all ranges is preferably between 0.001 inches and 0.006 inches, and most preferably is 0.002 inches. The pad 26 is then constructed to provide a flow velocity greater than 20 feet per second and, according to the fiber diameter size which has been chosen, to insure the absence of coalescence during operation. For instance, if 0.002 inch diameter wires or fibers 30 are utilized for the impact filtering pad, the flow velocity should be greater than 30 feet per second. In terms of gas turbines for marine applications, such a flow velocity is acceptable to provide a relatively low pressure drop across the moisture separator 10. Consequently, for such an arrangement, a two stage moisture separator 10 may be utilized for efficiently removing particles from the air flow therethrough, and in particular moisture particles therefrom, without the need for additional separating stages downstream thereof.

It is to be noted that the closer that the diameter of each individual wire 30 is to 0.001 inch, the higher the required velocity to eliminate coalescence as the wire has a greater tendency to coalesce which, as noted above, is undesirable if the third stage of the prior art is to be eliminated. On the other hand, increasing the wire diameter to almost 0.006 inches tends to reduce the efficiency of the pad 26 to remove the particles from the air and further serves to increase the resistance to flow and thus, pressure drop across the pad. Accordingly, because of these competing considerations, it has been found preferable that the diameter of the fibers 30 be on the order of 0.002 inches. This will lead to acceptable ranges of flow velocity to eliminate or minimize coalescence while also providing an acceptable pressure drop.

Accordingly, it is seen that the two stage separating device 10 in accordance with the present invention results in significant advantages over the prior art. The efficiency for removing particles entrained in the air is maintained (if not increased) while reducing the number of stages that is necessary. This in turn results in a substantial savings in weight, cost, and size for the device 10. Furthermore, the air flow velocities through the air duct can be increased without increasing the pressure drop across the moisture separator 10, thus allowing for a still further reduction in size of the overall assembly and a reduction in the chances of coalescence.

While the present invention has been described mainly in the context or removing moisture particles entrained in air for the gas turbine for ships, it will of course be understood by persons skilled in the art, that the filter pad 26 of the present invention can also be used for removing other types of particles. For example, the pad 26 is also efficient for removing sand or salt crystals which may be entrained in the air.

Accordingly, there is disclosed herein an improved method for removing particles entrained in air, and in particular for removing moisture particles entrained therein. In accordance with the improved method, the air is initially passed through an inertia separating means 14 at a flow velocity greater than 20 feet per second. This flow velocity is chosen as such relatively high flow velocities provide for more efficiency of the inertia separating device 14 to separate particles from the air. The partially processed air from the inertia separating means 14 is then passed at a flow velocity greater than a predetermined flow velocity to an impact filtering pad 26 for removal of particles entrained in the partially processed air. The impact filtering pad 26 comprises at least one layer of a plurality of fibers 30, each of the fibers 30 having a diameter greater than 0.001 inches and less than 0.006 inches, and the ratio of total surface area of the fibers in the pad 26 to the volume of the pad 26 being greater than 45 ft.$^{-1}$ and less than 1400 ft.$^{-1}$. The predetermined flow velocity is greater than 20 feet per second and is chosen according to the diameter of the fibers 30 in the impact filtering pad 26 so that there is no coalescence of moisture particles captured by the impact separating pad 26. In this manner, further filtering stages or devices will not be required downstream of the impact filtering pad 26 for recapturing re-entrained particles. This is a result of the fact that there is an absence of coalescence which might otherwise cause captured particles to be promoted to a larger size which have a greater possibility of becoming re-entrained by the air flow passing through the impact filtering pad 26.

While the preferred embodiment of the present invention has been shown and described, it will be understood that such is merely illustrative and that changes may be made without departing from the scope of the invention as claimed.

What is claimed is:

1. A method of removing particles entrained in air, the air including particles of moisture, the method comprising the steps of:
   passing the air at a velocity greater than 20 feet per second through an inertia separating means for inertially removing at least a portion of the larger sized particles from the air to provide partially processed air; and
   passing the partially processed air at a velocity which is greater than a predetermined velocity through an impact filtering pad for removing particles entrained in said partially processed air, said impact filtering pad comprising at least one layer of a plurality of fibers, each of said fibers having a diameter greater than 0.001 inches and less than 0.006 inches, and the ratio of total surface area of said fibers in said pad to the volume of said pad being greater than 45 ft.$^{-1}$ and less than 1400 ft.$^{-1}$, and said predetermined velocity being greater than 20 feet per second and chosen according to the diameter of said fibers of said impact filtering pad so that there is no coalescence of moisture particles captured by said impact filtering pad.

2. The method of claim 1 in which said impact filtering pad comprises a plurality of said layers of a plurality of fibers.

3. The method of claim 2 in which each of said fibers has a diameter of 0.002 inches.

4. The method of claim 3 in which said predetermined velocity is approximately 30 feet per second.

5. The method of claim 2 or 3 in which the ratio of the total surface area of said fibers in said pad to the volume of said pad is greater than 75 ft.$^{-1}$ and less than 200 ft.$^{-1}$.

6. The method of claim 5 in which each of said fibers comprises a metallic wire.

7. The method of claim 6 in which said wires of each of said layers are crimped.

* * * * *